(12) United States Patent
Antoni

(10) Patent No.: US 9,140,617 B2
(45) Date of Patent: Sep. 22, 2015

(54) SENSOR ARRANGEMENT COMPRISING MAGNETIC INDEX ENCODER IN A BEARING SEAL

(75) Inventor: Henrik Antoni, Freigericht (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 13/811,949

(22) PCT Filed: Jul. 22, 2011

(86) PCT No.: PCT/EP2011/062653
§ 371 (c)(1),
(2), (4) Date: Jan. 24, 2013

(87) PCT Pub. No.: WO2012/016861
PCT Pub. Date: Feb. 9, 2012

(65) Prior Publication Data
US 2013/0118273 A1    May 16, 2013

(30) Foreign Application Priority Data

Aug. 4, 2010 (DE) .......................... 10 2010 038 907
Jun. 29, 2011 (DE) .......................... 10 2011 078 281

(51) Int. Cl.
*G01L 25/00* (2006.01)
*G01L 3/10* (2006.01)
*F16C 41/00* (2006.01)
*F16J 15/32* (2006.01)
*G01D 5/14* (2006.01)
*F16C 33/78* (2006.01)

(52) U.S. Cl.
CPC ................. *G01L 3/101* (2013.01); *F16C 33/78* (2013.01); *F16C 41/007* (2013.01); *F16J 15/326* (2013.01); *G01D 5/145* (2013.01); *G01L 3/104* (2013.01)

(58) Field of Classification Search
CPC ............. G01L 3/10; G01L 25/00; G01L 3/02; G01L 3/00; G01B 5/30
USPC ........................................ 73/862.08, 862.193
See application file for complete search history.

(56) References Cited

U.S. PATENT DOCUMENTS

| 5,431,413 | A   | * | 7/1995  | Hajzler ........................ 277/317 |
| 7,633,289 | B2  | * | 12/2009 | Fayaud et al. ................. 324/174 |
| 7,923,993 | B2  | * | 4/2011  | Takahashi et al. ....... 324/207.25 |
| 7,960,967 | B2  | * | 6/2011  | Kobayashi .................... 324/174 |

(Continued)

FOREIGN PATENT DOCUMENTS

| DE | 691 03 665 T2 | 3/1995 |
| DE | 103 01 610 A1 | 8/2004 |

(Continued)

OTHER PUBLICATIONS

International Search Report for PCT/EP2011/062653 mailed Oct. 24, 2011.

(Continued)

*Primary Examiner* — Lisa Caputo
*Assistant Examiner* — Octavia Hollington
(74) *Attorney, Agent, or Firm* — RatnerPrestia

(57) ABSTRACT

The invention relates to a sensor arrangement including a torque sensor for measuring the torque acting on a first shaft and including a rotational angle index unit. The first shaft is supported by at least one bearing, the seal of the bearing including a magnetic index encoder that is detected by at least one magnetic sensor element.

17 Claims, 4 Drawing Sheets

(56) References Cited

U.S. PATENT DOCUMENTS

| | | | |
|---|---|---|---|
| 8,188,820 B2* | 5/2012 | Branchereau | 335/209 |
| 2009/0153136 A1 | 6/2009 | Kobayashi et al. | |
| 2009/0211376 A1 | 8/2009 | Landrieve | |
| 2010/0005909 A1* | 1/2010 | Antoni et al. | 73/862.325 |

FOREIGN PATENT DOCUMENTS

| | | | |
|---|---|---|---|
| DE | 10 2005 038 516 A1 | | 2/2007 |
| DE | 10 2007 056 539 A1 | | 5/2009 |
| DE | 11 2007 002 698 T5 | | 12/2009 |
| DE | 10 2009 033 242 A1 | | 1/2010 |
| DE | 102009033242 | * | 1/2010 |
| DE | 11 2009 000 269 T5 | | 5/2011 |
| JP | 2004-271180 | | 9/2004 |

OTHER PUBLICATIONS

German Search Report for DE 10 2011 078 281.8 mailed Mar. 29, 2012.

International Preliminary Report on Patentability dated Feb. 5, 2013.

* cited by examiner

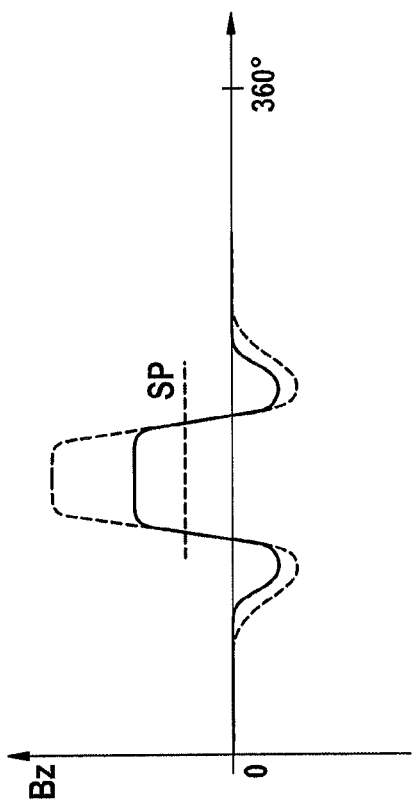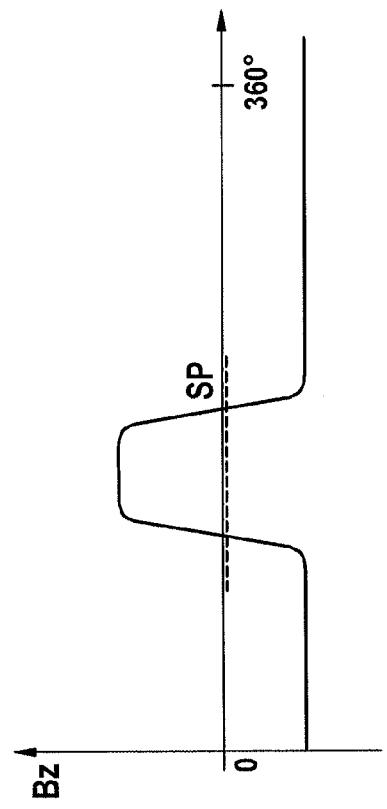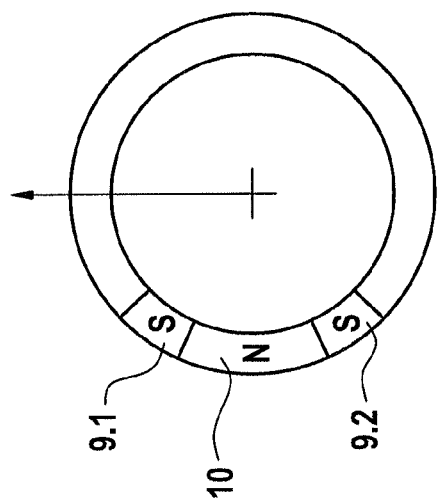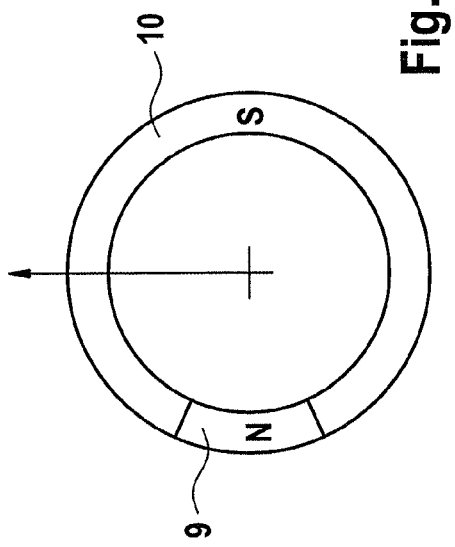
Fig. 4
Fig. 5

SENSOR ARRANGEMENT COMPRISING MAGNETIC INDEX ENCODER IN A BEARING SEAL

CROSS REFERENCE TO RELATED APPLICATIONS

This application is the U.S. National Phase Application of PCT/EP2011/062653, filed Jul. 22, 2011, which claims priority to German Patent Applications Nos. 10 2010 038 907.2, filed Aug. 4, 2010 and 10 2011 078 281.8, filed Jun. 29, 2011, the contents of such applications being incorporated by reference herein.

FIELD OF THE INVENTION

The invention relates to a sensor arrangement, comprising a torque sensor for the measurement of the torque acting on a first shaft and comprising a rotation angle index unit and to the use of the sensor arrangement in motor vehicles.

BACKGROUND OF THE INVENTION

More and more electronically assisted steering systems are used in modern motor vehicles. For controlling said steering systems it is necessary to detect the driver's command. A torque sensor is usually used for controlling the steering system. For determining the steering angle it is possible to determine the steering position using an intelligent commutation sensor of the steering assistance motor and a simple index sensor.

Owing to the desire to minimize the installation space in the axial direction, a solution with an additional fastening element is disadvantageous.

SUMMARY OF THE INVENTION

An aspect of the invention is a sensor arrangement that implements a rotation angle index unit relatively inexpensively and in a space-saving manner.

This is achieved according to the invention with the sensor arrangement comprising a torque sensor for the measurement of the torque acting on a first shaft and comprising a rotation angle index unit, wherein the first shaft is supported by at least one bearing, and wherein the seal of said bearing comprises a magnetic index encoder, which is detected by at least one magnetic field sensor element.

The preferred integration of the magnetic index encoder in the bearing seal is characterized by a relatively high degree of robustness.

It is preferred that the magnetic field sensor element is associated with the index encoder so that the magnetic field sensor element detects or can detect whether the rotation angle of the shaft is within a defined rotation angle or range of rotation angles or that the sensor arrangement is designed so that it can detect and/or identify the angular position of the shaft relative to a defined rotation angle and/or a defined range of rotation angles.

The index encoder preferably comprises magnetic particles, which are arranged or embedded in an elastomer, wherein said elastomer is in particular of annular form and is arranged as a seal of the bearing.

It is preferred that the magnetic field sensor element is in the form of a switching sensor element, in particular as a switching Hall element or a switching magnetoresistive magnetic field sensor element.

The index encoder preferably comprises at least one magnetization or a plurality of magnetizations as index marks. Here the magnetization of the at least one index mark has a magnetization direction that is in particular essentially orientated axially relative to the shaft, wherein said magnetization is particularly preferably formed essentially homogeneously within the index mark. Most particularly preferably, the index encoder comprises exactly one index mark or a plurality of index marks with such a magnetization.

It is preferred that the index encoder comprises a main index mark and two, or a number corresponding to a multiple of two, smaller auxiliary index marks, wherein the auxiliary index marks are formed and arranged in particular symmetrically on the right and left sides relative to the main index mark. The main index mark advantageously has a different magnetic polarity and/or magnetization direction compared to the two auxiliary index marks that are at least directly adjacent on the left and right sides.

It is advantageous that the index encoder comprises a single main index mark and a single smaller auxiliary index mark, wherein the main index mark encloses more than half the circumference, in particular more than 80% of the circumference, in relation to the ring of the seal, wherein the main index mark has a different magnetic polarity and/or magnetization direction compared to the auxiliary index mark.

It is preferred that one or each index mark identifies or enables the detection of a defined rotation angle or range of rotation angles of the magnetic index encoder or of the first shaft.

It is advantageous that the magnetic field sensor element of the rotation angle index unit, which measures a magnetic field produced by the permanent magnetic particles in the sealing surface of the upstream roller bearing, i.e. the magnetic coding of the seal as a magnetic index encoder, is mounted in the housing of the torque sensor or laterally on the torque sensor.

The torque sensor and the rotation angle index unit are preferably integrated in a common assembly. This enables production costs and installation costs to be reduced. The sensor elements and/or electronic components of the torque sensor and the rotation angle index unit are in particular arranged on a common circuit board and/or on a common chip.

It is preferred that the index encoder is connected directly or indirectly to the first shaft and rotates with the same and that the corresponding magnetic field sensor element of the rotation angle index unit is arranged in a fixed location and contactlessly relative to the first shaft.

It is preferred that the torque sensor comprises a first and a second shaft segment of the first shaft, which are both connected to each other by means of a torsion rod and are formed and arranged so as to be rotatable relative to each other, wherein a magnetic torque encoder is arranged on the first shaft segment and two stator elements associated with said torque encoder, each with protruding fingers, are arranged on the second shaft segment. In particular, the stator elements each comprise a soft magnetic ring element, which comprises particularly preferably essentially trapezoidal fingers axially protruding relative to the first shaft, wherein the fingers of the two stator elements mesh with each other contactlessly and wherein at least one torque-magnetic field sensor element is commonly associated with the stator elements, with which the relative rotation angle between the first and the second shaft segments is directly or indirectly detected, from which the torque acting on the first shaft is derived. Such a torque sensor has proved to be relatively precise and reliable. This design of trapezoidal fingers has proved to be particularly suitable for relatively precise guidance of the magnetic field.

Advantageously, the two shaft segments are each in the form of sleeves fixed on the first shaft or on the torsion rod.

Alternatively, the torque sensor preferably comprises no torsion rod or is designed so that the torque on an essentially stiff shaft is detected, wherein the torque sensor comprises at least one of the following torque sensor elements,
strain gages,
piezoelectric and/or piezoresistive sensor element,
magnetostrictive sensor element,
sensor element based on the use of surface waves,
wherein said at least one torque sensor element is directly or indirectly connected to the first shaft and/or is formed and arranged so that it can detect a torque acting on the first shaft.

The detection of the magnetic index encoder by the magnetic field sensor element of the rotation angle index unit or by the index sensor element preferably enables the determination of whether the respective relative rotation angle between the first shaft and a positionally fixed reference point or the index sensor element lies within a defined index region or a defined overlap region at a defined time point.

The sensor arrangement preferably comprises a common housing.

The invention relates, moreover, to the use of the sensor arrangement in motor vehicles, in particular as a torque sensor arrangement with rotation angle index detection, particularly preferably in the steering of a motor vehicle.

Advantageously, the invention also relates to a steering system with one of the sensor arrangements or sensor arrangement variants claimed or proposed above, wherein the first shaft is directly or indirectly mechanically coupled to a drive unit, in particular an electric motor or a hydraulic servo unit, so that the drive unit can cause a rotary movement of the first shaft, wherein the sensor arrangement comprises an angle sensor which detects the rotation angle of the drive shaft of the drive unit as a second shaft, wherein the angle sensor and the drive unit in particular are designed so that the angle sensor can detect the absolute rotation angle of the second shaft within a rotation.

BRIEF DESCRIPTION OF THE DRAWINGS

Further preferred example embodiments result from the dependent claims and the subsequent descriptions of example embodiments using figures.

FIGS. 1 through 5 show schematic example sensor arrangements.

DETAILED DESCRIPTION OF THE INVENTION

Figure 1:
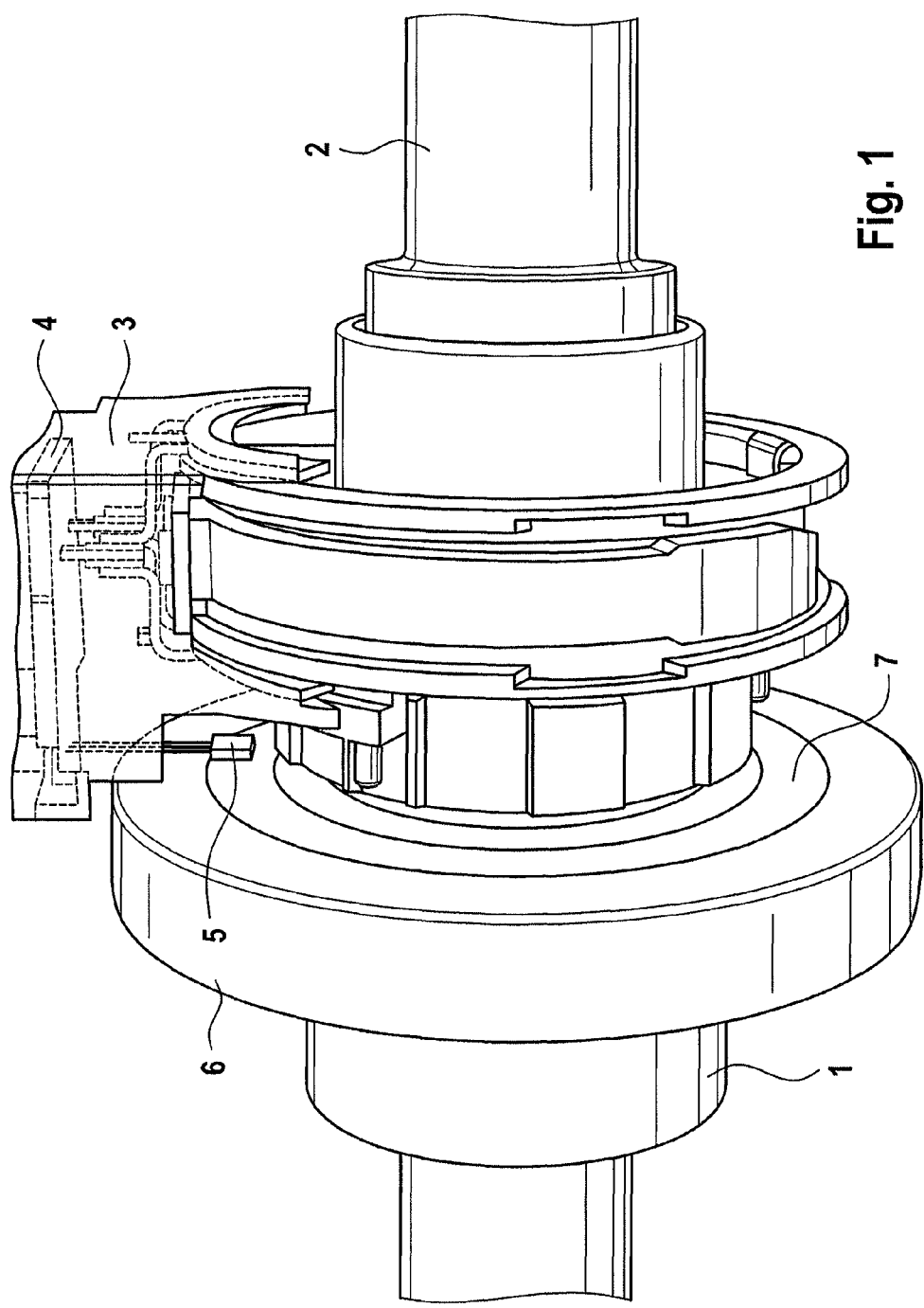

In FIG. 1 an input side steering shaft (steering wheel side) 1 and an output side steering shaft (steering gear side) 2 are illustrated, which are connected to a torsion rod. Said steering shaft 1, 2 forms the first shaft, on which the acting torque is to be measured by the torque sensor 3. A torque sensor 3 is illustrated at the interface of the shaft ends, on whose circuit board 4 a magnetic field sensor element 5 of a rotation angle index unit is additionally attached. Magnetic field sensor element 5 is associated with a seal 7 containing permanent magnetic material forming an index encoder, which is in the form of a seal 7 of a roller bearing 6 that supports the first shaft 1, 2.

Figure 2:
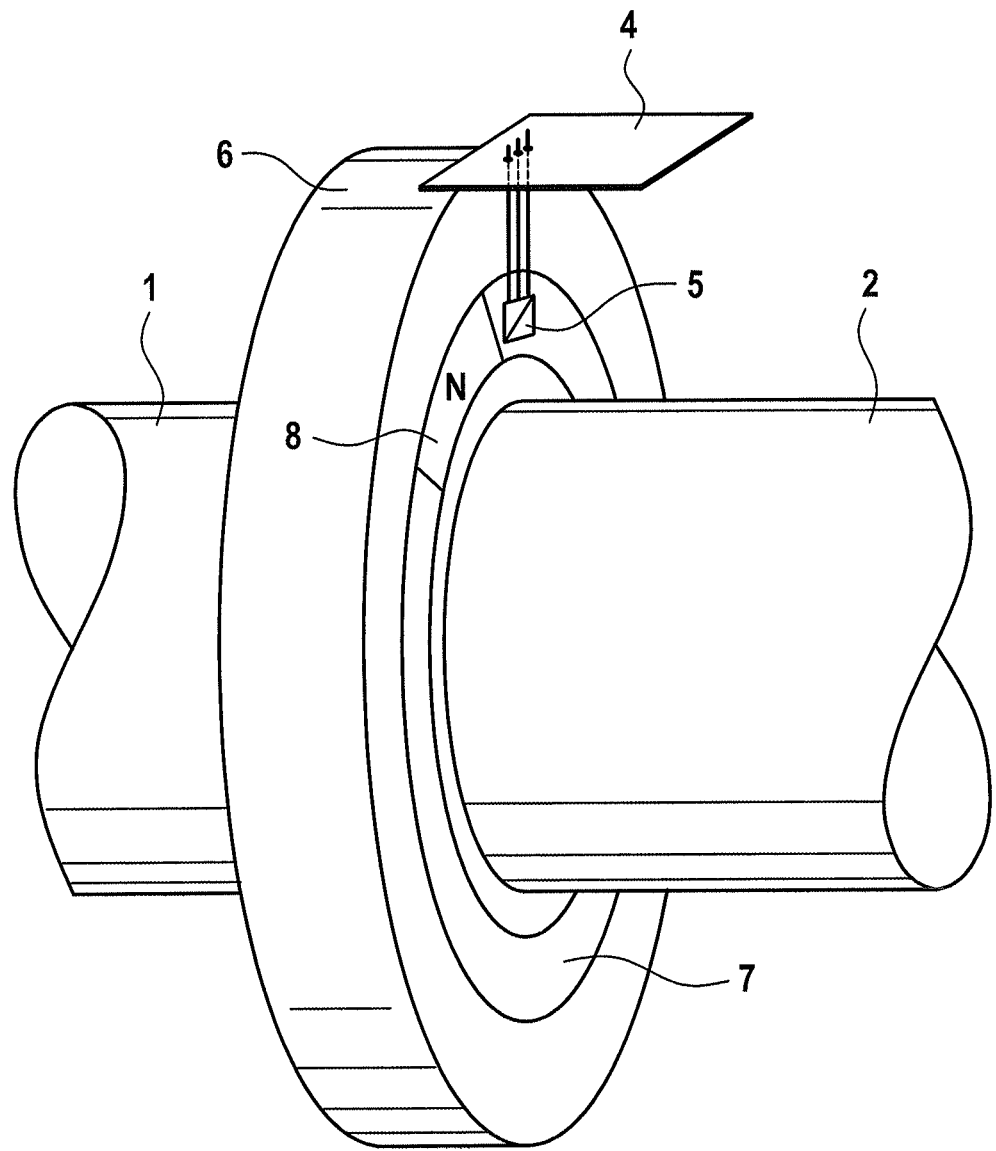

In FIG. 2 the same construction is shown as is shown schematically in FIG. 1, wherein the magnetization of an index mark 8 is formed in the axial direction relative to the shaft 1, 2. A magnetized pole of the magnetized region 8 of the index encoder 7, i.e. the index mark 8, is identified by "N".

Figure 3:
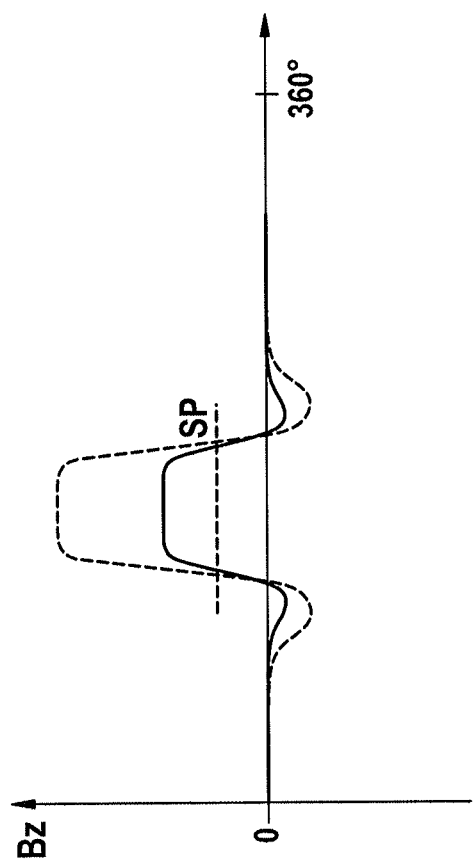
Figure 3:
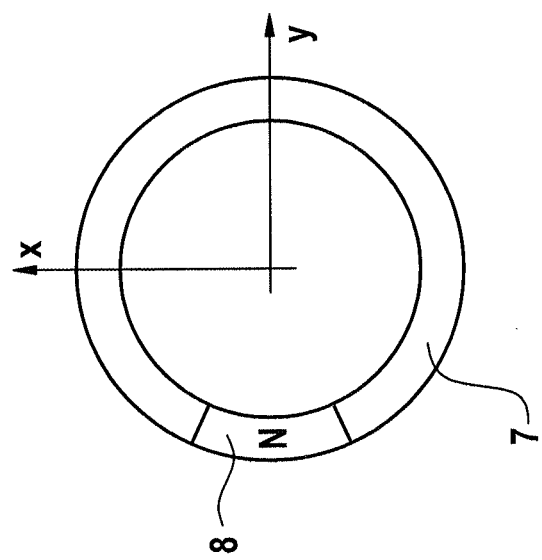

The magnetized seal 7 is illustrated in FIG. 3 as an index encoder comprising index mark 8. The magnetized region or index mark 8 causes a magnetic field in the axial direction, which is shown on the right in the diagram. The switching point SP of the magnetic field sensor element of the rotation angle index unit is significantly higher than an external magnetic field to be expected of a parasitic magnetic field, which could cause erroneous switching. The variation of the flux density Bz measured over the angular position shows that the angular position of the switching point SP is amplitude dependent. Said amplitude dependency expresses itself in a changed switching point depending on the distance between the magnet surface and the sensor element.

In order to improve the switching position, for example, as illustrated in FIG. 4 as an index encoder example embodiment, auxiliary index marks 9.1 and 9.2 with poles magnetized or formed oppositely to the main index mark are disposed before and after or to the left and right of the main index mark 10. The amplitude dependency Bz, SP is thus significantly smaller.

Alternatively, the magnetization can also be formed over the entire area of the magnetized sealing element, as in the example embodiment of an index encoder illustrated in FIG. 5. The magnetic field sensor element is thus permanently penetrated by a defined magnetic field, whose direction changes at the switching point SP. In this embodiment, significantly smaller magnetic fields can be used because the switching point no longer has to deviate from the null magnetic field to such an extent. For this purpose, the index encoder comprises a main index mark 10, which includes more than 80% of the circumference of the encoder, and an auxiliary index mark 9.

The invention claimed is:

1. A sensor arrangement, comprising a torque sensor for the measurement of torque acting on a first shaft and comprising a rotation angle index unit, wherein
the first shaft is supported by at least one bearing, and wherein a seal of said bearing comprises a magnetic index encoder disposed on the bearing, the magnetic index encoder detected by at least one magnetic field sensor element, and
wherein the index encoder comprises exactly one main index mark.

2. The sensor arrangement as claimed in claim 1, wherein the magnetic field sensor element is associated with the index encoder so that the magnetic field sensor element detects whether a rotation angle of the shaft is at a defined rotation angle or in a defined rotation angle range.

3. The sensor arrangement as claimed in claim 1, wherein the index encoder comprises magnetic particles, which are at least one of arranged and embedded in an elastomer, wherein said elastomer is of an annular form and is arranged as the seal of the bearing.

4. The sensor arrangement as claimed in claim 1, wherein the magnetic field sensor element is in the form of a switching sensor element.

5. The sensor arrangement as claimed in claim 4, wherein the switching sensor element is a switching Hall element or a switching magnetoresistive magnetic field sensor element.

6. The sensor arrangement as claimed in claim 1, wherein the index encoder comprises at least one magnetization as the index mark.

7. The sensor arrangement as claimed in claim 6, wherein the magnetization of the index mark has a magnetization direction which is essentially orientated axially relative to the shaft, and wherein said magnetization is formed essentially homogeneously within the index mark.

8. The sensor arrangement as claimed in claim 6, wherein the index encoder comprises the exactly one main index mark and two, or a number corresponding to a multiple of two, smaller auxiliary index marks, wherein the auxiliary index marks are formed and disposed symmetrically to the right and left sides in relation to the one main index mark.

9. The sensor arrangement as claimed in claim 8, wherein the main index mark has at least one of a different magnetic polarity and a different magnetization direction compared to the two at least immediately adjacent right and left side auxiliary index marks.

10. The sensor arrangement as claimed in claim 8, wherein the index encoder comprises the exactly one main index mark and a single smaller auxiliary index mark, wherein the one main index mark covers more than half the circumference in relation to the ring of the seal, and wherein the one main index mark has at least one of a different magnetic polarity and a different magnetization direction compared to the auxiliary index mark.

11. The sensor arrangement as claimed in claim 10, wherein the main index mark covers more than 80% of the circumference in relation to the ring of the seal.

12. The sensor arrangement as claimed in claim 1, wherein the torque sensor comprises a first and a second shaft segment of the first shaft, which are both connected together by a torsion rod and are formed and arranged so as to be rotatable relative to each other, and wherein a magnetic torque encoder is arranged on the first shaft segment and two stator elements associated with said torque encoder, each with protruding fingers, are arranged on the second shaft segment.

13. The sensor arrangement as claimed in claim 12, wherein the stator elements each comprise a soft magnetic ring element, which comprises trapezoidal fingers protruding axially in relation to the first shaft, wherein the fingers of the two stator elements mesh together contactlessly and wherein at least one torque-magnetic field sensor element is commonly associated with the stator elements, by which the relative rotation angle between the first and the second shaft segments is directly or indirectly detected, from which the torque acting on the first shaft is derived.

14. The sensor arrangement as claimed in claim 1, wherein the torque sensor is absent a torsion rod, and the torque sensor comprises at least one of the following torque sensor elements,
  i) strain gages,
  ii) at least one of a piezoelectric and a piezoresistive sensor element,
  iii) a magnetostrictive sensor element,
  iv) a sensor element based on the use of surface waves, and
  wherein said at least one torque-sensor element is at least one of (i) connected directly or indirectly to the first shaft and (ii) is formed and arranged so that it can detect a torque acting on the first shaft.

15. The sensor arrangement as claimed in claim 1, wherein the magnetic index encoder is disposed on an inner surface of an outer portion of the bearing.

16. The sensor arrangement as claimed in claim 1, wherein the magnetic index encoder moves along an inner surface of an outer portion of the bearing.

17. A sensor arrangement for use in a motor vehicle, said sensor arrangement comprising:
  a torque sensor for the measurement of torque acting on a first shaft and comprising a rotation angle index unit, wherein
  the first shaft is supported by at least one bearing, and wherein the seal of said bearing comprises a magnetic index encoder disposed on the bearing, the magnetic index encoder detected by at least one magnetic field sensor element, and
  wherein the index encoder comprises exactly one main index mark.

\* \* \* \* \*